US008782360B2

(12) United States Patent  (10) Patent No.: US 8,782,360 B2
Cammarata et al.  (45) Date of Patent: Jul. 15, 2014

(54) PRESERVING AN EXISTING VOLUME MAP IN RE-INITIALIZING A DATA STORAGE VOLUME

(75) Inventors: James B. Cammarata, La Grange Park, IL (US); Gavin Stuart Johnson, San Jose, CA (US); Michael John Koester, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 1025 days.

(21) Appl. No.: 12/779,938

(22) Filed: May 13, 2010

(65) Prior Publication Data

US 2011/0283077 A1 Nov. 17, 2011

(51) Int. Cl.
*G06F 12/00* (2006.01)
*G06F 11/16* (2006.01)
*G06F 11/14* (2006.01)

(52) U.S. Cl.
CPC ........ *G06F 11/1658* (2013.01); *G06F 11/1446* (2013.01)
USPC ....... 711/162; 711/202; 711/114; 711/E12.08

(58) Field of Classification Search
CPC .......................... G06F 11/1446; G06F 11/1658
USPC .................. 711/112, 114, 170, E12.001, 202
See application file for complete search history.

(56) References Cited

U.S. PATENT DOCUMENTS

| | | | |
|---|---|---|---|
| 4,750,106 A | 6/1988 | Aiken | |
| 4,939,598 A | 7/1990 | Kulakowski et al. | |
| 5,435,004 A | 7/1995 | Cox et al. | |
| 5,546,557 A * | 8/1996 | Allen et al. | 711/111 |
| 6,665,743 B2 * | 12/2003 | Benhase et al. | 711/111 |
| 6,880,102 B1 * | 4/2005 | Bridge | 714/6.12 |
| 7,191,304 B1 * | 3/2007 | Cameron et al. | 711/202 |
| 7,266,719 B1 * | 9/2007 | LeCrone et al. | 714/5.11 |
| 7,461,100 B2 | 12/2008 | Spear et al. | |
| 7,647,360 B2 * | 1/2010 | Kano | 707/999.2 |
| 8,452,932 B2 * | 5/2013 | Pangal et al. | 711/162 |

(Continued)

FOREIGN PATENT DOCUMENTS

| | | | |
|---|---|---|---|
| JP | 56090361 A | 7/1981 | |
| JP | 59003661 A | 1/1984 | |

(Continued)

OTHER PUBLICATIONS

"Volume Initialization Undo", Published by IP.COM, Publication No. IPCOM000174421D, Sep. 8, 2008.

(Continued)

*Primary Examiner* — Pierre-Michel Bataille
(74) *Attorney, Agent, or Firm* — David W. Victor; Konrad, Raynes, Davda and Victor LLP

(57) ABSTRACT

A method, system and computer-program product for re-initializing a storage volume with an previously created volume map being preserved to allow access to previously stored data sets. The invention includes creating a new volume map in an unused volume area where the new volume map has pointers to new data sets. One of the new data sets contains the previously created volume map that points to previously created data sets. Each volume map is referenced by a volume label and includes a VTOC and an optional VTOC index. The pointers in the VTOC are data set control block (DSCB) records.

14 Claims, 6 Drawing Sheets

(56) References Cited

U.S. PATENT DOCUMENTS

| | | | |
|---|---|---|---|
| 2004/0098424 A1* | 5/2004 | Seidenberg et al. | 711/162 |
| 2006/0107103 A1 | 5/2006 | Rodrigues et al. | |
| 2007/0220214 A1 | 9/2007 | Sandrock-Grabsky | |
| 2008/0263271 A1 | 10/2008 | Kishi et al. | |
| 2009/0193062 A1 | 7/2009 | Chauvet et al. | |
| 2010/0169592 A1* | 7/2010 | Atluri et al. | 711/162 |
| 2013/0024640 A1* | 1/2013 | Reed et al. | 711/170 |

FOREIGN PATENT DOCUMENTS

| | | | |
|---|---|---|---|
| JP | 1274230 A | 11/1989 | |
| JP | 3109653 A | 5/1991 | |
| JP | 5341919 A | 12/1993 | |

OTHER PUBLICATIONS

"z/OS V1R11.0 DFSMSdfp Advanced Services", Document No. SC26-7400-09, IBM Corporation, http://publibfp.boulder.ibm.com/bookmgr/BOOKS/DGT2S360/CCONTENTS?DT=20090616085732, 2005.

"ICKDSF R17 User's Guide", Document No. GC35-0033-36, IBM Corporation, http://publibfp.boulder.ibm.com/cgi-bin/bookmgr/BOOKS/ICK4020J/CCONTENTS?DT=20090604175832, 2009.

"Mainframe Concepts", IBM z/OS Basic Skills Information Center, IBM Corporation, http://publib.boulder.ibm.com/infocenter/zos/basics/index.jsp?topic=/com.ibm.zos.zconcepts_171.htm.

* cited by examiner

PRESERVING AN EXISTING VOLUME MAP IN RE-INITIALIZING A DATA STORAGE VOLUME

FIELD OF THE INVENTION

The present invention relates to computer data storage systems, and more particularly, to the preservation of an existing volume map in a data storage system when the volume is re-initialized to allow recovery of previously stored data.

BACKGROUND

Direct Access Storage Devices (DASDs) continue to be the systems of choice for storing large amount of persistent data in enterprise data centers due to their high capacity, performance and relatively low cost. Examples of common DASD-based data storage systems include the IBM System Storage DS8000® products offered by International Business Machines corporation of Armonk, N.Y.

Data in storage systems are typically stored in organization units referred to as storage volumes. A Direct Access Storage Device maintains a volume map for each volume that contains information on sets of data stored on the volume. The volume map is used by an operating system to manage user data and free space on the device. Before user data can be stored on a storage device, an initializing operation must be performed to prepare a storage volume on the device for accepting user data. For example, in the IBM z/OS® operating system, a storage volume may be initialized using the Device Support Facility program "ICKDSF" to write a volume label record and a Volume Table of Contents (VTOC), which make up the volume map of the volume. A pointer to the Volume Table of Contents is maintained within the volume label record. User data on a volume is stored in data sets and pointers to these data sets are maintained in records of the Volume Table of Contents. These records are called Data Set Control Blocks (DSCBs). In most cases, the volume has a VTOC index that has pointers to the DSCB records in the Volume Table of Contents for improved performance.

A subsequent re-initialization of the storage volume typically rewrites the volume label record, the Volume Table of Contents, and the VTOC index. This destroys the pointers to any existing data sets on the volume and as a result, access to user data is lost. Due to human error, a wrong storage volume might be chosen for re-initialization, resulting in the destruction of an existing Volume Table of Contents and the loss of valuable user data. An inadvertent re-initialization of the wrong volume is an infrequent event; however, when it does occur, the results can be catastrophic depending on the contents of the volume.

If a user determines that the re-initialization of a volume was done in error, the user has no immediate way to recover user data. The lost data can only be recovered if it had been backed up to some other media, such as another storage volume or tape storage, prior to the re-initialization. No simpler solutions for recovering the lost data are currently available. Backing up all user data to some other media, however, is not only time-consuming but also requires the temporary use of some other media that may or may not be readily available at the time the re-initialization is performed.

From the foregoing, there still exists a need for an improved system and process for preserving an existing volume map in a data storage system when the a storage volume is re-initialized to allow recovery of previously stored data.

SUMMARY

The present invention addresses the foregoing need by providing a method, system and computer program product for re-initializing a data storage volume while preserving an existing volume map to allow previously stored data to be recovered if needed. The invention comprises creating a new volume map in an unused area of the volume where the new volume map has pointers referencing new data sets on the volume. One of the new data sets includes a previously created volume map and the previously created volume map has pointers that reference previously created data sets.

The details of the preferred embodiments of the invention, both as to its structure and operation, are described below in the Detailed Description section in reference to the accompanying drawings. The Summary is intended to identify key features of the claimed subject matter, but it is not intended to be used to limit the scope of the claimed subject matter.

DETAILED DESCRIPTION OF THE INVENTION

Figure 1:
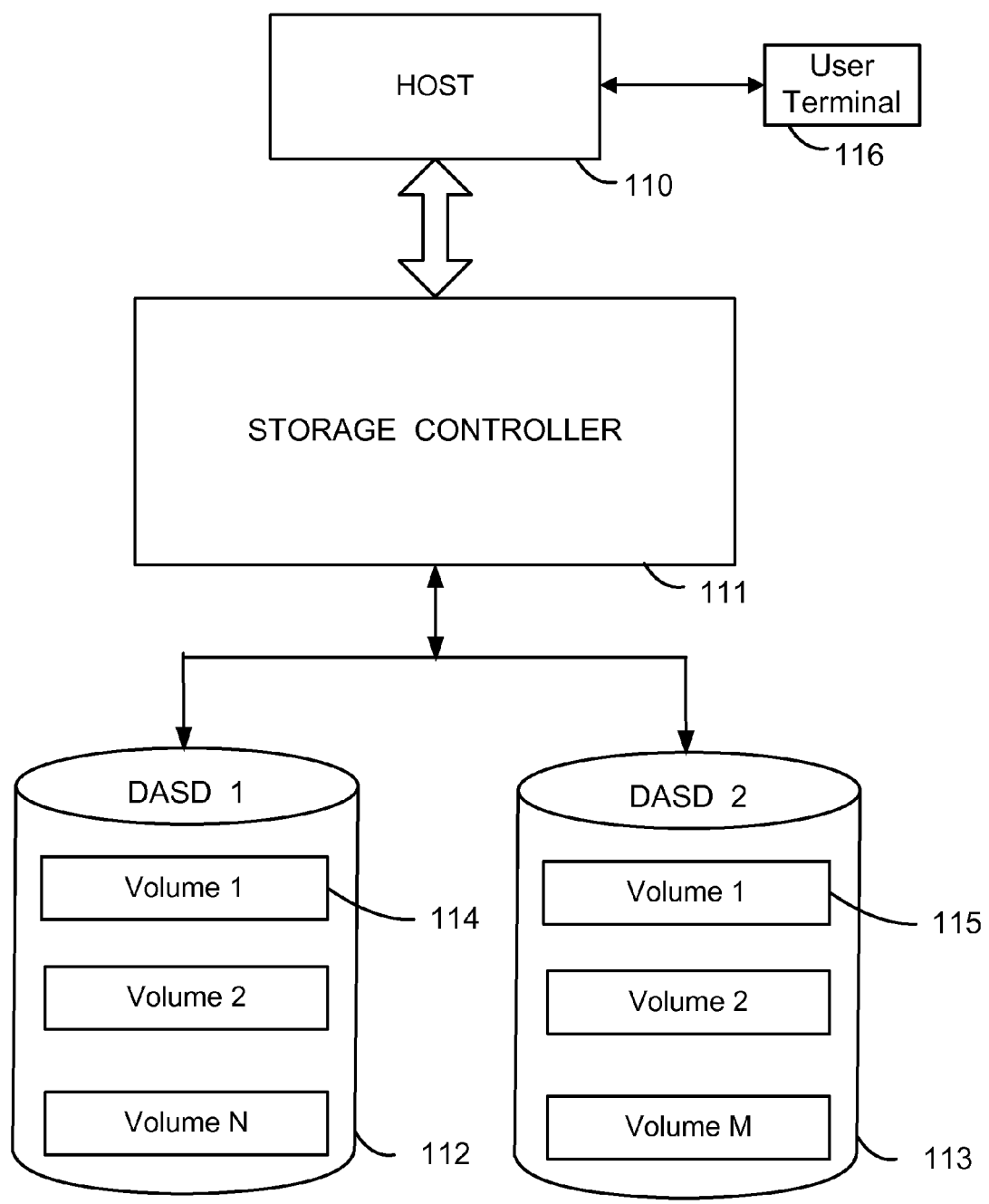
FIG. 1 is a block diagram illustrating an exemplary embodiment of a storage system comprising a host, a storage controller and storage devices for providing aspects of the invention.

The present invention relates to a method, system and computer program product for re-initializing a data storage volume while preserving an existing volume map to allow access to previously stored data if needed. The invention includes creating a new volume map in an unused area of the volume where the new volume map has pointers referencing new data sets on the volume. One of the new data sets includes a previously created volume map and the previously created volume map has pointers that reference previously created data sets.

As will be appreciated by one skilled in the art, aspects of the present invention may be embodied as a method, system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described below illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the figures and in particular to FIG. 1, there is illustrated an exemplary embodiment of a data storage system for providing aspects of the present invention. The illustrated storage system includes a host computer 110 connected to a storage controller 111. Host computer 110 is a computer equipped with a CPU (Central Processing Unit) (not shown) and memory. The CPU of the host computer 110 executes various programs, thereby realizing a variety of functions. The host computer 110 is, for example, a workstation or a mainframe computer that can perform data input to or output from a storage devices 112-113 via storage controller 111. An example of the host 110 is the IBM System z10® server marketed by International Business Machines corporation. The host 110 might be connected to the controller 111 via a LAN (Local Area Network), a SAN (Storage Area Network), a Fibre Channel interface or other host interface protocols.

Users and computer programs may store data on devices 112-113 and retrieve data from them, using various data organization formats and access methods as further described below. For storing, accessing and retrieving data to and from storage devices 112-113, users and programs interact with an operating system that runs in the host computer 110. A user terminal 116 is attached to the host 110 to allow a user to initialize the storage devices 112-113 before data might be stored thereon as well as managing all aspects of data storage in the storage system. The storage controller 111 is typically connected to multiple data storage devices 112-113, such as Direct Access Storage Devices DASD 1 and DASD 2, through a storage device interface such as the Fibre Channel FC-AL interface. The storage controller 111 and storage devices 112-113 may be packaged in the same physical enclosure in high-performance storage systems such as the IBM System Storage DS8000 Turbo® products, which support Fibre Channel, Serial ATA (SATA) and solid-state disk (SSD) drives. Multiple storage controllers 111 and storage devices 112-113 may be arranged in various disk array (RAID) configurations with appropriate storage software support to provide data redundancy and recovery. One or more logical volumes 114-115 (hereinafter referred to as "volumes") are set in physical storage areas provided by one or more storage devices 12-113. These logical storage volumes 114-115 are described below with reference to FIGS. 3-6.

Figure 2:
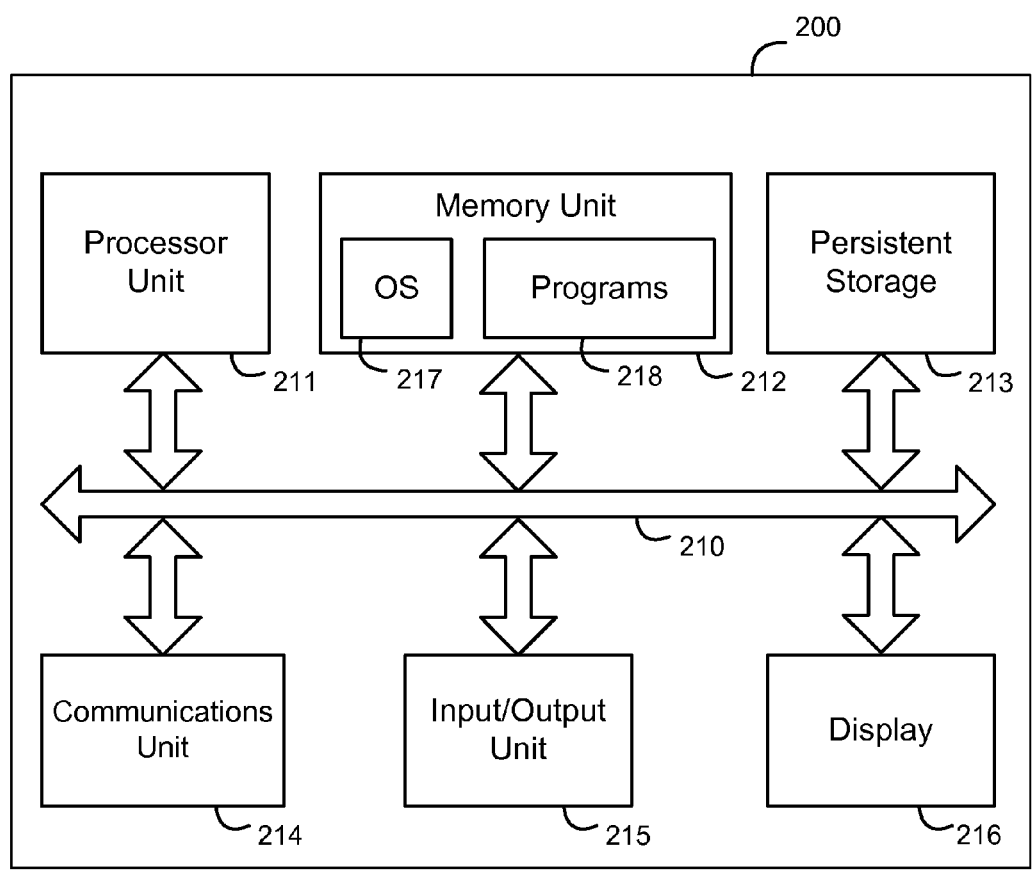
FIG. 2 is a block diagram showing a representative host computer system in which aspects of the invention may be implemented.

FIG. 2 shows a block diagram of the components in a data processing system that can be used as a host computer 110. As shown, a data processing system 200 includes a processor unit 211, a memory unit 212, a persistent storage 213, a communications unit 214, an input/output unit 215, a display 216 and a system bus 210. Computer programs are typically stored in persistent storage 213 until they are needed for execution by operating system 217, at which time the programs are brought into the memory unit 212 (as programs 218) so that they can be directly accessed by the processor unit 211. The processor unit 211 selects a part of memory unit 212 to read and/or write by using an address that the processor 211 gives to memory 212 along with a request to read and/or write. Usually, the reading and interpretation of an encoded instruction at an address causes the processor 211 to fetch a subsequent instruction, either at a subsequent address or some other address. The processor unit 211, memory unit 212, persistent storage 213, communications unit 214, input/output unit 215, and display 216 interface with each other through the system bus 210.

Data Storage and Management

Data can be stored on secondary storage devices, such as a direct access storage device (DASD) or a magnetic tape device. The term DASD applies to disks or to a mass storage medium on which a computer stores data. In the following description of the exemplary embodiments of the invention, DASD storage volumes will be used as an example, but the description is equally applicable to other storage devices that support data volumes. A volume is a standard unit of secondary storage. All types of data sets may be stored on DASD, but only sequential data sets may be stored on magnetic tape. Mountable tape volumes may reside in an automated tape library.

Although DASD volumes differ in physical appearance, capacity, and speed, they are similar in data recording, data checking, data format, and programming regardless of how the data is actually written to the storage subsystem media. Data for a logical DASD volume is written as blocks. Each block of data on a DASD volume has a distinct location and a unique address, making it possible to find any block without extensive searching. Blocks may be stored and retrieved either directly or sequentially.

Data management is the part of the operating system that organizes, identifies, stores, catalogs, and retrieves all the information (including programs) in a computer system. Data management handles the following main tasks:

Sets aside (allocates) space on DASD volumes.
Automatically retrieves cataloged data sets by name.
Mounts magnetic tape volumes in the drive.
Establishes a logical connection between an application program and the medium.
Controls access to data.
Transfers data between the application program and the medium.

Information is recorded on all DASD volumes in a standard format. This format is called count-key data (CKD) or extended count-key data (ECKD). Each track contains a record 0 (also called track descriptor record or capacity record) and data records. Units of data written on DASD volumes are referred to as records or blocks. The process of grouping records into blocks is called blocking. The extraction of records from blocks is called unblocking. Blocking or unblocking might be done by the application program or the operating system.

Figure 3:
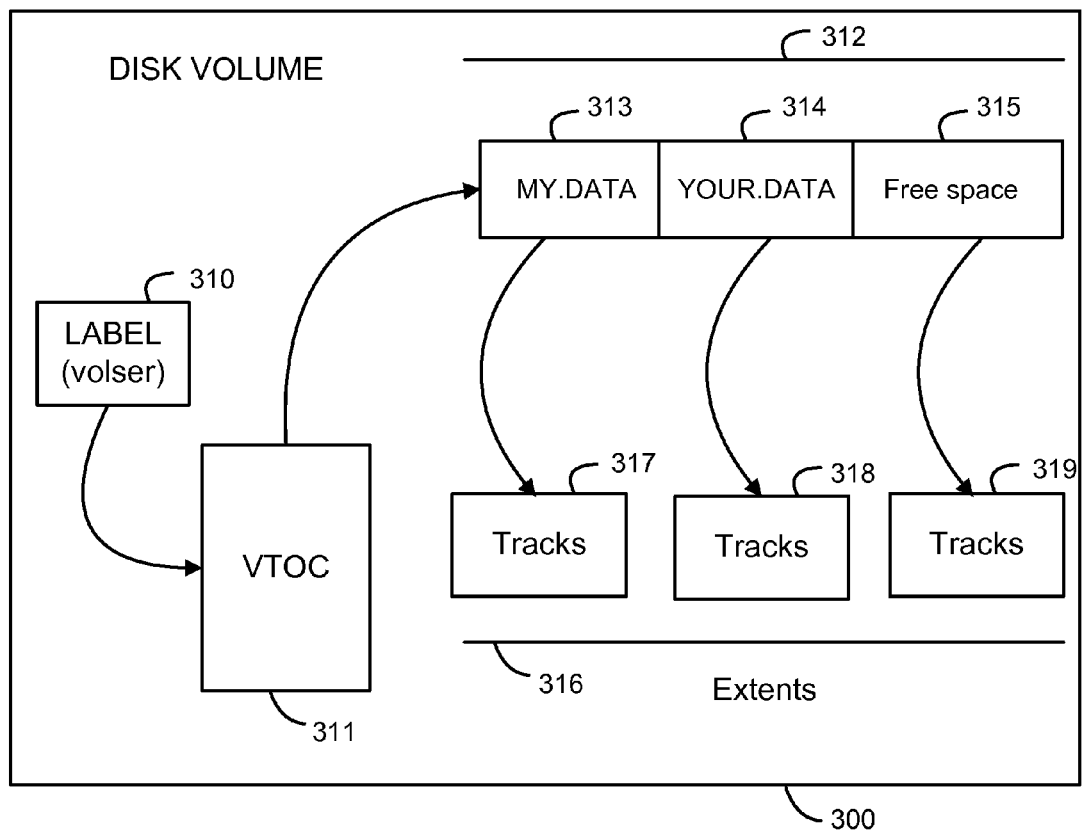
FIG. 3 is a block diagram illustrating an example of the contents in a storage volume including a volume label, a Volume Table of Contents (VTOC), data sets referenced by the VTOC, and data tracks corresponding to the data sets, in accordance with aspects of the invention.

In storing data into and retrieving data from a DASD, an operating system uses groups of labels to identify DASD volumes and the data sets that they contain. Application programs generally do not use these labels directly. DASD volumes use standard labels where each standard label includes a volume label, a data set label for each data set, and optional user labels. A volume label, stored at track 0 of cylinder 0, identifies each DASD volume. FIG. 3 illustrates an example of a disk volume 300 which includes a label (or volume serial) 310 that points to data units on the volume 300, according to exemplary embodiments of the invention.

Volume Initialization

Before a storage volume may be used by a computer system, a device support facility program, like the IBM Device Support Facility ICKDSF, must initialize each storage volume 300. The device support facility installs, initializes and maintains a device, either under an operating system, or standalone. The initialization operation, e.g., using the ICKDSF command INIT, generates a volume label 310, builds a Volume Table of Contents (VTOC) 311 and initializes volume 300. There are generally three levels of initialization: minimal initialization, medial initialization, and initialization for open-system devices.

A minimal initialization writes a volume label 310 and a VTOC 311 on the device for use by an operating system. It creates the contents of cylinder 0, track 0 and writes a volume label as a record. Access to a previous VTOC 311 is destroyed. Medial initialization includes the actions of minimal initialization, and the validation of the existence and contents of the tracks in a specified range. Reinitializing a volume 300 purged existing data and as a result, a previous VTOC 311 is destroyed.

Volume Table of Contents (VTOC)

In data storage architectures, a Volume Table of Contents (VTOC) 311 is a data structure that provides a way for locating user data sets 313-314 that reside on a particular disk volume. It can reside within the first 65,535 tracks on the volume and lists the names of user data sets 313-314 on the volume, along with information about the location and size of each user data set 313-314 and other data set attributes. When a disk volume 300 is initialized using a disk utility, the disk owner can specify the location and size of the VTOC 311. The size can be quite variable, ranging from a few tracks to perhaps 100 tracks, depending on the expected use of the volume. More data sets 313-314 on the disk volume require more space in the VTOC 311. The VTOC 311 also has entries for all the free space 315 on the volume. Allocating space for a data set 313-314 causes system routines to examine the free space 315 records, update them, and create a new VTOC entry. Data sets 313-314 are an integral number of tracks 317-319 (or cylinders) and start at the beginning of a track (or cylinder). Groups of data tracks 317-319 are referred to as extents 316. A storage management program, which may be part of the operating system, uses the Volume Table of Contents 311 to manage the storage and placement of the data sets 313-314 in data storage area 312.

Figure 4:
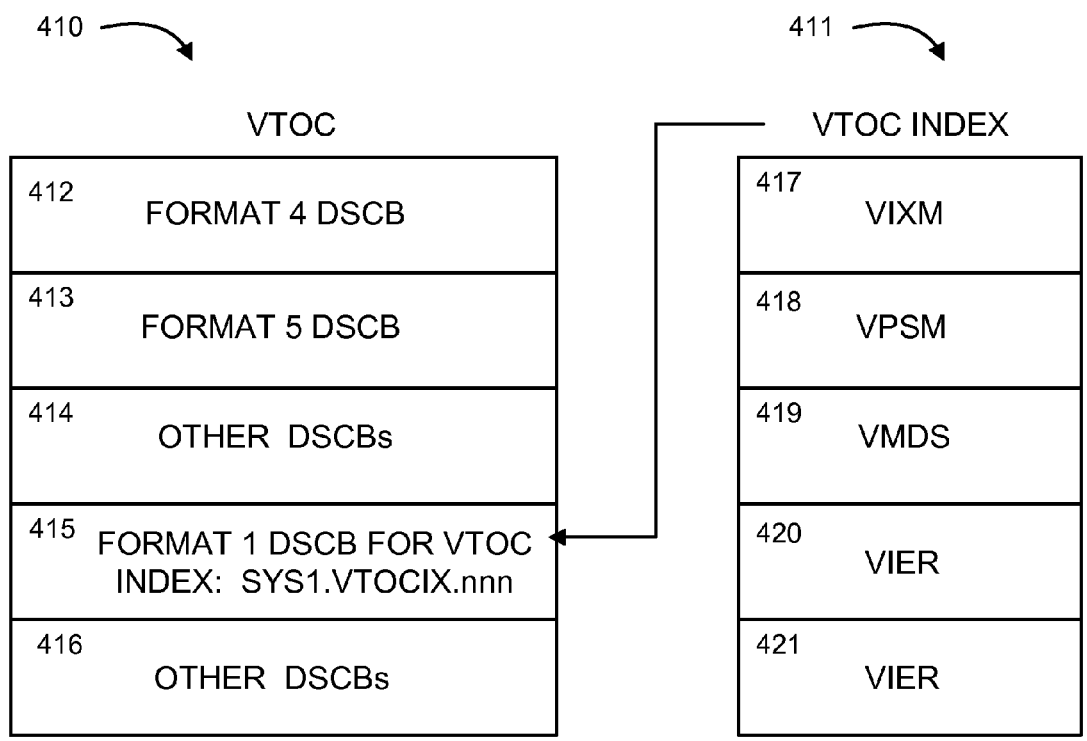
FIG. 4 is a block diagram showing exemplary embodiments of a Volume Table of Contents and a Volume Table of Contents index, in accordance with aspects of the invention.

FIG. 4 illustrates an example of the contents in a Volume Table of Contents 410, according to exemplary embodiments of the invention. The VTOC 410 typically includes 140-byte Data Set Control Blocks (DSCBs) 412-416 that correspond either to data sets currently residing on the volume, or to contiguous, unassigned tracks on the volume. Additionally, it contains an entry for every area of contiguous free space 315 on the volume. The third record on the first track of the first cylinder of any volume of DASD is known as the volume label 300 and contains a pointer to the location of the VTOC 410. A VTOC 410 is added to a disk when it is initialized using the device support utility program such as ICKDSF.

To locate a user data set 313-314, a program will generally interrogate a catalog in the operating system to find the volume where the data set resides. A catalog describes data set attributes and indicates the volumes on which a data set is located. Having found the correct volume, the VTOC 410 is searched to find out where on the disk the data set is stored. There are generally eight types of Data Set Control Block (DSCB) records 412-416 that may appear in the VTOC 410, as shown in Table 1.

TABLE 1

| DSCB FORMAT TYPE | PURPOSE | NOTES |
| --- | --- | --- |
| 0 | Empty entry | |
| 1 | Data set primary extents | Describes the first three extents of a data set |
| 3 | Data set extension | Describes data set extents after the third |
| 4 | VTOC | Describes volume attributes |
| 5 | Free space | Describes free space on the volume for devices with 65,535 tracks or less. Not used if the VTOC is indexed |
| 7 | Free space | Describes free space on the volume for devices with more than 65,535 tracks. Not used if the VTOC is indexed |
| 8 | Data set primary extents with extended attributes | Describes the first three extents of a data set with extended attributes |
| 9 | Data set extended attributes extension | Describes additional attributes for a data set with extended attributes |

The first DSCB record 412 in the VTOC 410 is always a format-4 DSCB which describes the VTOC 410 itself and attributes of the disk volume 300 on which this VTOC 410 resides. The second DSCB 413 is always a format-5 DSCB which describes free space within the VTOC 410. Normally, the rest of the VTOC 410 will contain format-0 DSCBs, which are empty entries, and format-1 or format-3 DSCBs, which describe data sets 313-314, giving their start address on disk. The initial part of a data set 313-314 is described by a format-1 DSCB. If necessary, format-3 DSCBs are used to describe further parts of the data set. When a data set is deleted, its format-1 DSCB is overwritten to become a format-0 DSCB.

A search of the VTOC 410 is a sequential scan of the DSCBs 412-416, stopping when the correct format-1 DSCB 415 is found or the end of the VTOC 410 is reached. As disk volumes became larger, VTOC search became a bottleneck and a VTOC index 411 was added.

VTOC Index

In addition to the VTOC 410, a VTOC index 411 is optionally used by data storage administrators to enhance the performance of VTOC 410 access, e.g., with the parameter INDEX when issuing the ICKDSF command INIT. The VTOC index 411 is a separate sequential data set on the same volume 300 as the related VTOC 410 and contains four record types that give information on volume 300 and VTOC 410 status. It consists of an index of data set names in the DSCB records contained in the VTOC 410 and information on free space on the volume. The entries in the VTOC index 411 are arranged alphabetically by data set name with pointers to the VTOC entries. The VTOC index 411 further includes bitmaps of the volume free space. The use of the VTOC Index 411 provides performance improvements in the areas of volume space management and I/O operations to the VTOC 410. A VTOC index 411 allows the user to find a data set much faster. It is therefore highly recommended and is required for a SMS-managed (storage management subsystem) volume.

A device support facility (e.g., ICKDSF) initializes a VTOC Index 411 into physical blocks called VTOC index records (VIRs). VIRs are used in several ways. In the exemplary embodiments of the invention, a VTOC index 411 includes the following kinds of VIRs:

VTOC index entry record (VIER) identifies the location of format-1 and format-8 DSCBs and the format-4 DSCB.

VTOC pack space map (VPSM) identifies the free and allocated space on a volume.

VTOC index map (VIXM) identifies the VIRs that have been allocated in the VTOC index.

VTOC map of DSCBs (VMDS) identifies the DSCBs that have been allocated in the VTOC.

A format-1 DSCB 415 in the VTOC 410 contains the name and extent information of the VTOC index 411. The name of the index is generally 'SYS1.VTOCIX.volser', where 'volser' is the serial number of the volume containing the VTOC 410 and its VTOC index 411. The relationship between a VTOC 410 to its VTOC index 411 is shown in FIG. 4.

The size of the VTOC 410 can be set based on the maximum number of user data sets 313-314 that will reside on the volume. The number of DSCBs 412-416 in the VTOC 410 determines the number of data sets 313-314 or VSAM data spaces that can reside on a volume. The size of the VTOC index 411 data set depends upon:

The size of the volume (total number of cylinders and tracks)

The track length (in bytes)

The number of tracks occupied by the VTOC

Volume Map

A volume map collectively refers to a volume serial, a Volume Table of Contents and an optional index to the Volume Table of Contents, all of which help identified data stored on the volume. Information relating to a volume map may be generated by performing a scan of the storage volume using a device support facility such as the IBM utility program ICKDSF. An example of a volume map generated by ICKDSF is shown in Table 2.

Data Sets

A data set 313-314 is a collection of logically related data and can be a source program, a library of macros, or a file of data records used by a processing program. Data records are the basic unit of information used by a processing program. By placing data in volumes of organized data sets 313-314, data can be processed, saved, printed and displayed. Data sets 313-314 may be organized as physically sequential ("PS"), indexed sequential ("IS"), partitioned ("PO"), or Direct Access ("DA"). Data sets 313-314 on tape may only be physically sequential. The choice of organization depends on how the data is to be accessed, and in particular, how it is to be updated. Various access methods may be used depending on a data set organization.

TABLE 2

ICKDSF - xxx DEVICE SUPPORT FACILITIES yyy TIME: 00:23:00
mm/dd/yy PAGE 1
INIT UNIT(0127) NVFY VOLID(tstvol) VTOC(1,1,1)
.
.
.
ICK31061I 0A93 VTOC INDEX CREATION SUCCESSFUL: VOLUME
IS IN INDEX FORMAT
ICK061I 0A93 VTOC INDEX CREATION SUCCESSFUL: VOLUME
IS IN INDEX FORMAT
ICK01307I DEFECTIVE-TRACK LIST IN HEXADECIMAL FOR
VOLUME TSTVOL
ICK01308I THE FOLLOWING PRIMARY TRACKS WERE
FOUND DEFECTIVE:
CCHH OF TRACK --- CCHH OF ALTERNATE --- FLAGGED
DEFECTIVE
0003 0003 0375 0001 YES
0004 0004 0375 0002 YES
0004 0005 0375 0003 YES
0005 0005 0375 0004 YES
0006 0006 0375 0005 YES
0006 0007 0375 0006 YES
000C 000A 0375 0000 YES
ICK01312I NO DEFECTIVE ALTERNATE TRACKS WERE FOUND.
ICK01313I VOLUME CONTAINS 15 ALTERNATE TRACKS -- 8
AVAILABLE.
ICK01314I VTOC IS LOCATED AT CCHH = X'0001 0001' AND
IS 1 TRACKS.
ICK00001I FUNCTION COMPLETED, HIGHEST CONDITION CODE
WAS 0 00:26:00 mm/dd/yy Regardless of the data organization used, the physical structure of each record is essentially the same, and is uniform throughout a data set. This may be specified in the record format designation RECFM, which can be a fixed-length record or a variable-length record. A Partitioned Data Set (PDS) contains multiple members, each of which holds a separate sub-data set, similar to a directory in other types of files systems. This type of data set is often used to hold executable programs (load modules) and source program libraries. Besides members, a PDS consists also of their directory. Each member can be accessed directly using the directory structure. Once a member is located, the data stored in that member is handled in the same manner as a PS (sequential) data set.

An access method defines the technique used to store data into a data set and retrieve data from the data set. Access methods are selected primarily by the data set organization. For example, the basic sequential access method (BSAM) or queued sequential access method (QSAM) are used for sequential data sets. Other access methods include basic direct access method (BDAM), basic partitioned access method (BPAM), or virtual storage access method (VSAM).

Figure 5:
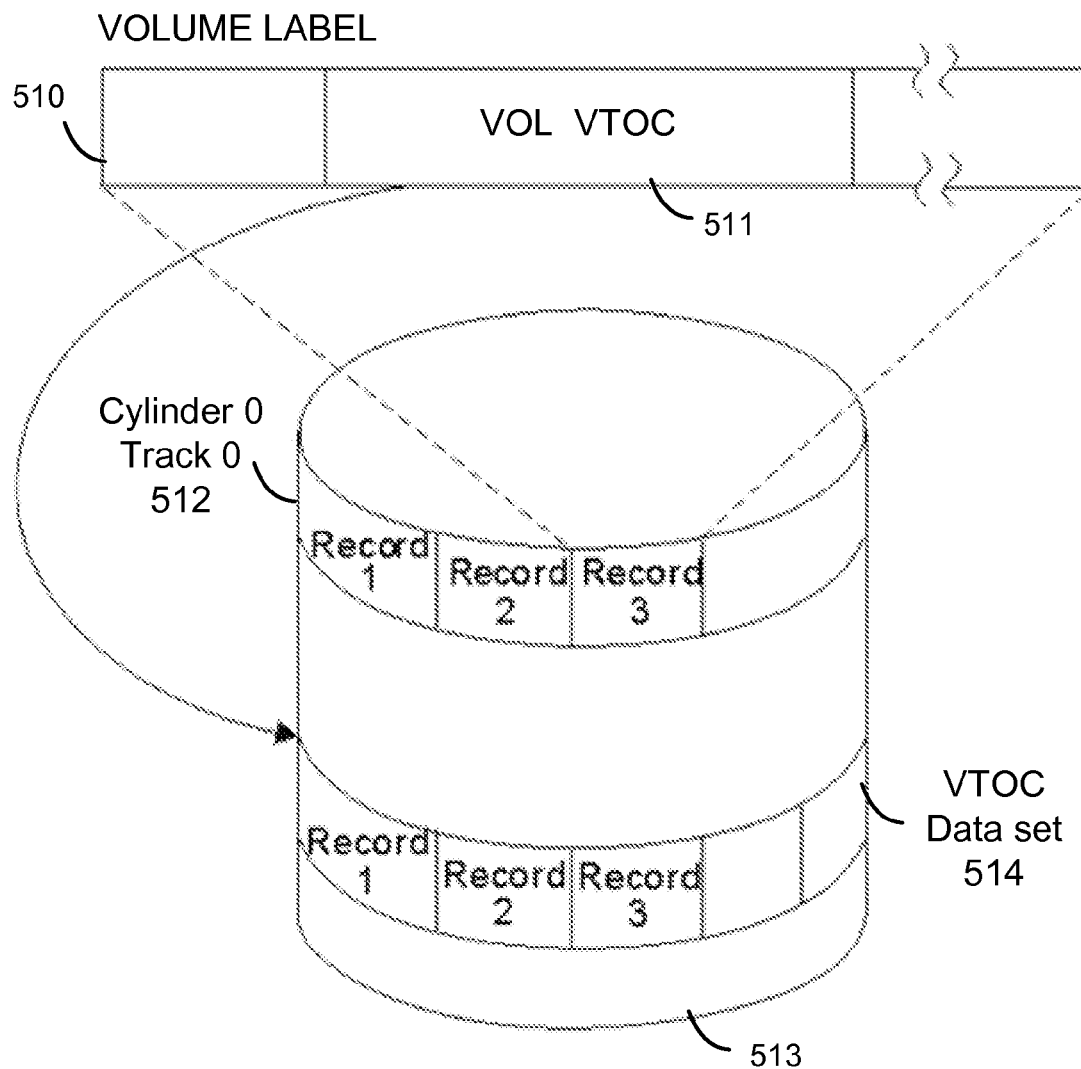
FIG. 5 is a block diagram illustrating the relationship between a volume label (volume serial) and a data set containing a Volume Table of Contents, in accordance with aspects of the invention.

FIG. 5 illustrates the relationship between a volume label, a Volume Table of Contents and a data set referenced in the Volume Table of Contents, according to exemplary embodiments of the invention. A data set 512 occupies track 0 of cylinder 0 on storage volume 513. Record 3 of the data set 512 has a standard volume label 510 for the volume 513. The standard volume label 510 includes VOL VTOC field 511 which points to a VTOC data set 514. The VTOC data set 514 may be located anywhere on the volume 513, after track 0, cylinder 0.

Figure 6:
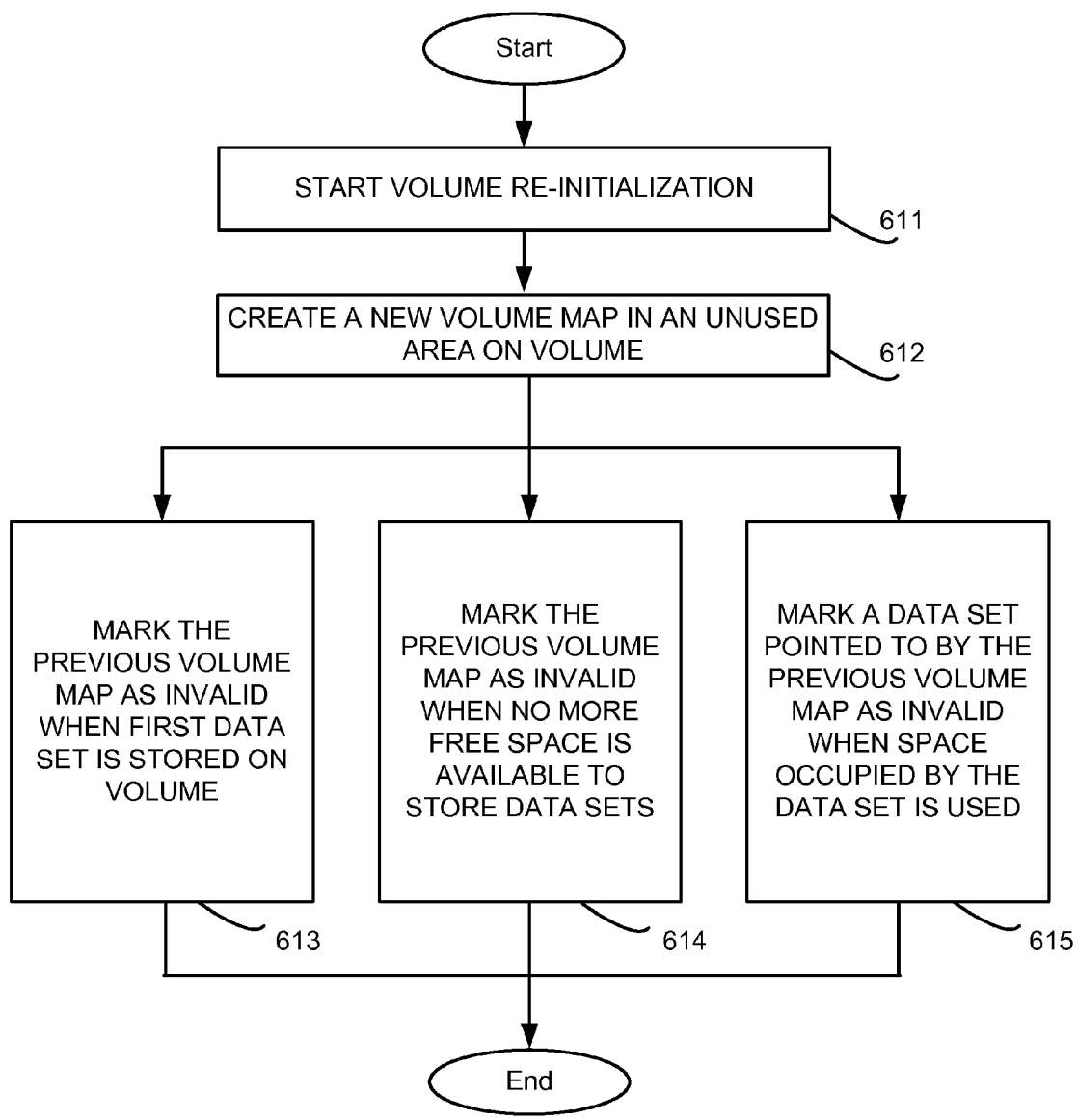
FIG. 6 is a flow chart of an exemplary embodiment of a process for re-initializing a data storage volume, in accordance with aspects of the invention.

FIG. 6 is a flow diagram of an exemplary embodiment of a process for re-initializing a data storage volume in which an existing volume map is preserved to allow previously stored data sets to be recovered if needed. At block 611, the re-initialization of the volume is initiated. In the exemplary embodiments of the invention, the re-initialization is done by a device support program such as ICKDSF. At block 612, a new volume map is created in an unused area 315 of the volume. This implies that if a location is specified for the new volume map and the specified location does not map to free space extents as described by the existing volume map, then the specified location is ignored by the device support program.

At block 613, as soon as the first new data set is stored on the volume, the existing VTOC is marked "invalid" and access to all old data sets that are referenced by the existing VTOC is no longer possible. This is the simplest, most-straightforward implementation. The intent here is to provide the user a way to regain access to existing data immediately after recognizing that the wrong volume may have been re-initialized but before any new data sets have been placed on the volume.

In another exemplary embodiment of the invention, the previously stored data sets are preserved as long as possible in case they will be needed after the volume re-initialization, as shown by block 614. In this embodiment, as new data sets are placed on the volume, both the new VOTC and the preserved VTOC are checked to make sure that the new data sets are only placed in an area that has not been used for either new or old data sets. Eventually, as more data sets are placed on the volume, the available free space will reach a point where the areas occupied by the old data sets must be used for the new data sets. At that point the old, preserved VTOC is marked "invalid" and access to all old data sets is no longer possible.

Block 615 of FIG. 6 shows still another exemplary embodiment of the process for re-initializing a storage volume where the old data sets are preserved. As before, the volume will reach a state where the areas occupied by old data sets start to be used for the new data sets. As these areas are overlaid by new data, the individual old data sets are marked as "invalid" in the preserved Volume of Contents, one by one as needed. In this exemplary embodiment of the re-initialization process, the previously stored data sets can be preserved as long as possible, but on a more granular level.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

What is claimed is:

1. A computer-implemented method for re-initializing a data storage volume, comprising:
creating a new volume map in an unused area of the volume, the new volume map having pointers referencing new data sets on the volume, one of the new data sets including a previously created volume map, and the previously created volume map having pointers referencing previously created data sets; and
marking the previously created volume map included in one of the new data sets as invalid to regain space occupied by the previously created data sets in response to an occurrence of an event comprising
when a first new data set is stored on the volume,
when no more free space is available, or when space occupied by the particular previously created data set is used for the new data sets.

2. The method of claim 1, wherein each of the volume maps includes a volume table of contents (VTOC).

3. The method of claim 2, wherein each of the volume maps is referenced by a volume label record.

4. The method of claim 2, wherein the VTOC includes data set control block records.

5. The method of claim 4, wherein the data set control block records are pointed to by a VTOC index.

6. The method of claim 5, wherein the re-initialization rewrites the VTOC and VTOC index associated with the previously created volume map.

7. The method of claim 1, further comprising restoring the previously created data sets based on the previously created volume map referenced by the new volume map.

8. The method of claim 1, wherein the storage volume is re-initialized using a storage device support utility.

9. A computer-program product for re-initializing a data storage volume, the program product comprising a storage medium readable by a computer and embodying program instructions executable by the computer to:
creating a new volume map in an unused area of the volume, the new volume map having pointers referencing new data sets on the volume, one of the new data sets including a previously created volume map, and the previously created volume map having pointers referencing previously created data sets; and
marking the previously created volume map included in one of the new data set as invalid to regain space occupied by the previously created data sets in response to an occurrence of an event comprising
when a first new data set is stored on the volume,
when no more free space is available, or
when space occupied by the particular previously created data set is used for the new data sets.

10. The computer-program product of claim 9, wherein each of the volume maps includes a volume table of contents (VTOC).

11. The computer-program product of claim 9, wherein each of the volume maps is referenced by a volume label record.

12. The computer-program product of claim 9, further comprising program instructions executable by the computer to restore the previously created data sets based on the previously created volume map referenced by the new volume map.

13. A system for re-initializing a data storage volume, comprising a logic component for:
creating a new volume map in an unused area of the volume, the new volume map having pointers referencing new data sets on the volume, one of the new data sets including a previously created volume map, and the previously created volume map having pointers referencing previously created data sets; and
marking the previously created volume map included in one of the new data set as invalid to regain space occupied by the previously created data sets in response to an occurrence of an event comprising
when a first new data set is stored on the volume,
when no more free space is available, or
when space occupied by the particular previously created data set is used for the new data sets.

14. The system of claim 13, wherein each of the volume maps includes a volume table of contents (VTOC) and the VTOC includes data set control block (DSCB) records.

* * * * *